United States Patent
Winter

[11] 3,789,233
[45] Jan. 29, 1974

[54] STATIC CONVERTER ARRANGEMENT
[75] Inventor: Peter Winter, Baden, Switzerland
[73] Assignee: Brown Boveri & Company Limited, Baden, Switzerland
[22] Filed: Sept. 19, 1972
[21] Appl. No.: 290,410

[30] Foreign Application Priority Data
Oct. 11, 1971  Switzerland.................... 14712/71

[52] U.S. Cl.................... 307/17, 318/61, 318/64, 318/91, 318/94, 318/109, 321/47
[51] Int. Cl..................... H02p 7/68, H02p 13/24
[58] Field of Search...... 307/17, 33; 318/67, 98, 99, 318/341, 345, 61, 64, 91, 94, 109; 321/26, 27 R, 47

[56] References Cited
UNITED STATES PATENTS

| | | | |
|---|---|---|---|
| 3,422,338 | 1/1969 | Philipps | 321/27 R |
| 3,263,142 | 7/1966 | Adoutte et al. | 318/99 |
| 3,181,050 | 4/1965 | Berman | 318/345 X |
| 3,551,781 | 12/1970 | Smith | 318/345 X |

Primary Examiner—A. D. Pellinen
Attorney, Agent, or Firm—Ralph E. Parker et al.

[57] ABSTRACT

A static converter arrangement comprises at least two converter units having substantially the same configuration and each of which includes at least two series-connected semi-controlled converter bridge circuits. At least two of such bridge circuits of one converter unit have an uncontrolled bridge portion in common and are connected to a tapped secondary winding of a transformer such that one top is connected to a circuit point between anode and cathode of the semiconductor valves of the uncontrolled bridge portion via a choke. Thus the converter arrangement comprises at least two chokes, one for each connector unit, and these chokes are magnetically in reverse-series connection.

3 Claims, 3 Drawing Figures

STATIC CONVERTER ARRANGEMENT

SUMMARY OF THE INVENTION

A major problem with static converters is that when their ignition phase angle is not fully advanced for partial load in the chopped-wave control operation they cause severe harmonics in the network current. The use of chokes to reduce the harmonics is known. An unfavourable consequence of these inductances is generally that the commutation of current is delayed with respect to voltage zero. A phase displacement between the alternating current and voltage, however, is equivalent to a greater reactive power requirement.

It has been proposed already to provide the secondary winding of the transformer of the converter with a central tapping, a choke being connnected in the line leading away from the central tapping. The choke then acts beneficially in that it is effective only when the converter is at partial load (reduction of harmonics), but not when it is at full load.

If in an arrangement with semi-controlled converter bridges one of these bridges subjected to the lowest a.c. voltage is operated alone at full load, the choke similarly delays the current rise. Even without a choke the network current would rise sufficiently slowly because of the voltage half-wave rising from zero (no haromonics at full load), and the result would therefore be an unnecessary worsening of the power factor.

The object of the invention is to create a converter arrangement which causes few harmonics in the network current and exhibits a better power factor. This is achieved in that the chokes of the converter units are arranged magnetically in reverseseries connection.

Particularly in the case of a.c. traction vehicles (locomotives), at least two such converter units of the kind stated above are combined to form one converter arrangement. With two, three or four bogies (drive units) a separate converter unit is allocated to each bogie.

Concerning a first version, in which the secondary windings of the transformer are provided exclusively with a central tapping, it is recommended that the chokes should be connected in the lines leading away from said central tappings.

Concerning a second version, in which the secondary windings referred to are provided with tappings after one-fourth and one-half of their total number of turns, it is preferable that the chokes should be connected in the lines leaving after one-fourth of the total turns.

The advantage of the invention lies particularly in a significant improvement of power factor. Furthermore, a considerable saving of weight and space is achieved in that the respective choke coils of the converter units are located on a common core. Although the size of the core must be suited to the number and dimensions of the chokes, as regards the magnetic stress it is necessary to make allowance only for the magnetic flux expected to be caused by a single choke. If two, four or six chokes are carrying current simultaneously, the resultant flux is zero.

DETAILED DESCRIPTION OF THE INVENTION

The invention will now be explained in more detail with reference to the drawings, in which:-

Figure 1:
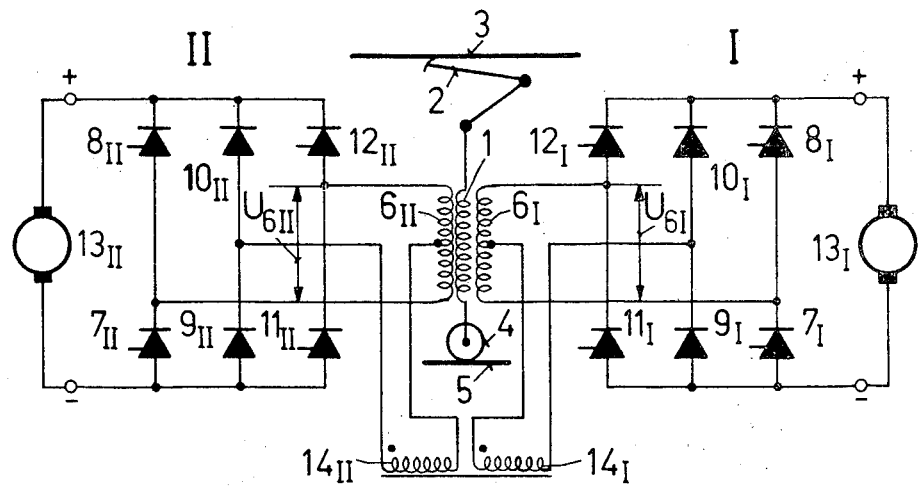
FIG. 1 shows diagrammatically an example of a first version of the invention.

FIG. 1 shows two converter units I and II, each comprising two semi-controlled converter bridge circuits connected in series on the a.c. side, being connected to two secondary windings $6_I$ and $6_{II}$ of a transformer. The primary winding I of the transformer (taking the example of a locomotive) is connected to a single-phase a.c. network, on the one hand via a current collector 2 and a conductor wire 3, and on the other via (at least) one wheel 4 and a rail 5.

Each converter unit feeds a motor $13_I$ or $13_{II}$, motor $13_I$ for example, feeding the foreward driving wheels, when viewed in the direction of travel. The mode of operation of converter unit I will now be explained, this being representative of both units.

In order to vary the d.c. output voltage continuously up to the maximum value, thyristors $7_I$ and $8_I$ being provided as controlled valves are first triggered in known manner, i.e., $7_I$ during one half-wave and $8_I$ during the other, the thyristors initially being fired in such a way that they conduct for only brief periods, and thus chop only small sections out of the a.c. network voltage (ignition phase-angle control). To increase the d.c. output voltage the thyristors are fired progressively earlier until at full load thyristor $7_I$, for example, conducts the complete positive half-wave, and $8_I$ the following negative half-wave.

The controllable valves, i.e., thyristors $7_I$ and $8_I$ together with the uncontrollable valves, i.e., diodes $9_I$ and $10_I$ thus form one semi-controlled converter bridge circuit, and thyristors $11_I$ and $12_I$ with the same diodes $9_I$ and $10_I$ form a second such semi-controlled converter bridge circuit.

While the ignition phase angle of thyristors $7_I$ and $8_I$ is being advanced, the direct current flows during the positive voltage half-wave, for example, from the central tapping of the secondary winding $6_I$ via a choke $14_I$, diode $10_I$, motor $13_I$ and thyristor $7_I$ back into the lower half of secondary winding $6_I$. During the negative half-wave the direct current commutates from thyristor $7_I$ to diode $9_I$, then flows in the opposite direction through choke $14_I$, by way of the central tapping through the lower half of secondary winding $6_I$ and thyristor $8_I$ to the motor $13_I$.

When thyristors $7_I$ and $8_I$ are fully conducting, the d.c. voltage output available is 50 percent of the possible maximum because only the lower half of secondary winding $6_I$ is effective.

Once full load is reached, thyristor $12_I$, for example, can take over in place of thyristor $7_I$, and thyristor $11_I$ takes over from thyristor $8_I$, whereupon the upper half of the secondary winding $6_I$ becomes effective.

To further increase the d.c. output voltage, thyristors $7_I$ and $8_I$ are again operated in the chopped-wave mode, while thyristors $11_I$ and $12_I$ remain at full load. This form of control has the advantage that the control device of only one converter bridge circuit (thyristors $7_I$, $8_I$ and diodes $9_I$, $10_I$) has to be capable of ignition phase-angle control, while a simple control device is sufficient for the second bridge series-connected on the a.c. side (thyristors $11_I$, $12_I$ and diodes $9_I$, $10_I$).

Figure 2:
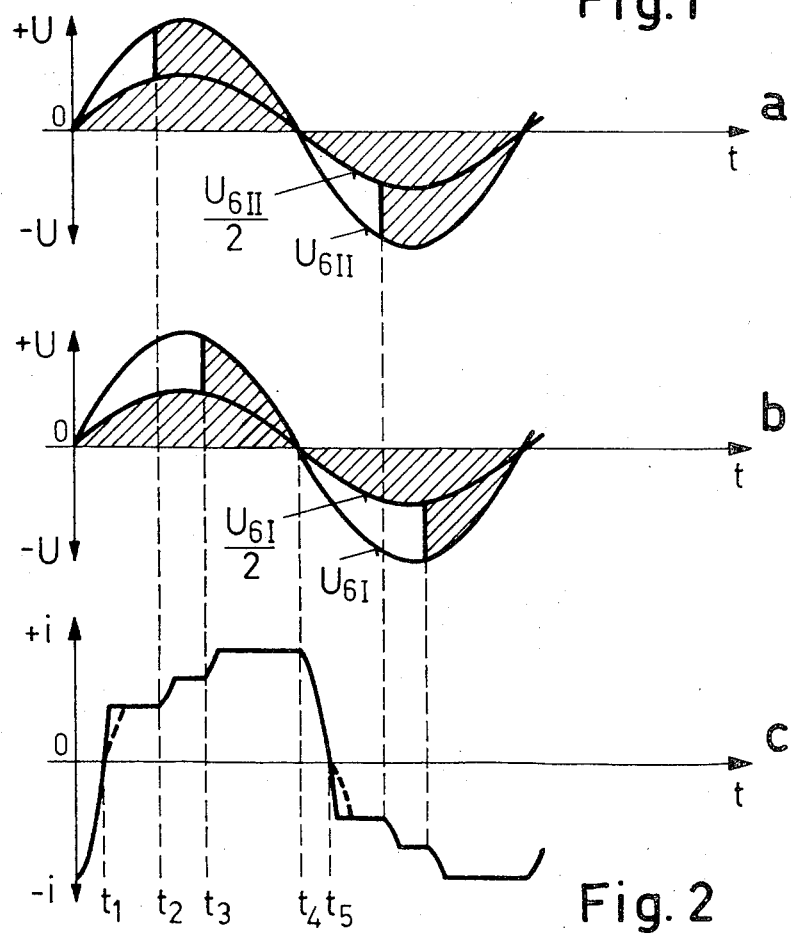
FIG. 2a shows a voltage/time diagram.
FIG. 2b shows another voltage/time diagram.
FIG. 2c shows a current/time diagram.

FIGS. 2a and 2b show curves with respect to time of the secondary voltages $U_{6I}$ and $U_{6II}$, and $U_{6I}/2$ and $U_{6II}/2$. The hatched areas when these voltages are switched through to the motors.

The curve of the alternating network current in shown in FIG. 2c.

The current commutation due to voltage reversal (secondary voltages change from the negative to the positive half-wave) occurs at time $t_o$, whereas the network current, because of inductances (motor, transformer, etc.), does not reverse its direction until $t_1$.

Because in both converter units I and II one bridge circuit is always being operated at full load (thyristors $12_I$ and $12_{II}$ with diodes $9_I$ and $9_{II}$), the alternating network current follows the driving voltages $U_{6I}/2$ and $U_{6II}/2$. Because the chokes $14_I$ and $14_{II}$ are magnetically in reverse-series connection (beginning of winding is marked by a spot) their effects cancel each other out, so that the rise of the network current is not delayed unnecessarily. If the chokes $14_I$ and $14_{II}$ were not in reverse-series connection (i.e. separate) the network current would follow the path indicated by the broken line, but this would result in an unfavourable power factor (FIG. 2c).

At time $t_2$, for example, thyristor $7_{II}$ is fired, in addition to the fully advanced rectifier bridge with the conducting thyristor $12_{II}$, so that from this moment onwards the full secondary voltage $U_{6II}$ is applied to the motor $13_{II}$.

The resulting rise of the direct current is suitably delayed by choke $14_{II}$ so that the harmonics imposed on the a.c. network are as weak as possible.

Choke $14_{II}$ can become effective because this increased current is not compensated by a corresponding current in choke $14_I$.

As soon as the now greater direct current flowing through motor $13_{II}$ has been taken over completely by thyristor $7_{II}$, choke $14_{II}$ ceases to carry current. The direct current then flows away from the secondary winding $6_{II}$ by way of thyristor $12_{II}$, and back again by way of thryistor $7_{II}$.

When this state has been reached, thyristor $7_I$ of rectifier arrangement I can be fired in addition to the conducting thyristor $12_I$, at time $t_3$, for example. Choke $14_I$ then delays current commutation in the desired manner since, as shown above, choke $14_{II}$ is dead. Because commutation occurs more slowly the rise of network current is also delayed accordingly. Once the commutation process is complete, choke $14_I$ is also dead. The direct current flowing through motor $13_I$ is then directed by way of thyristors $7_I$ and $12_I$.

When the direction of the driving secondary voltages $U_{6I}$ and $U_{6II}$ reverses at time $t_4$, thyristors $11_I$ and $11_{II}$ are fired (phase angle fully advanced), whereupon current commutation again takes place. The delayed current zero at $t_5$ (FIG. 2c) is due solely to the inductances of the motors $13_I$ and $13_{II}$ and of the rectifier transformer; chokes $14_I$ and $14_{II}$ are still dead.

During the negative voltage half-wave the process described above is repeated in the corresponding manner.

It must be emphasised that the thyristors of both converter units operating at part load must always fire at different moments, as otherwise the effects of the chokes $14_I$ and $14_{II}$ would always cancel each other out.

Here advantage is taken of the fact that when a traction vehicle accelerates, the rear drive wheels, when viewed in the direction of travel, are always pressed harder against the rails, and so can be used to transmit greater torque. In the example in FIG. 1, motor $13_{II}$ is allocated to the rear drive wheels; it thus receives more power than motor $13_I$.

The rectifier arrangements I and II shown in FIG. 1 are considered as two-stage because the maximum d.c. output voltage is variable in two coarse steps.

Multiple-stage rectifier arrangements are also possible, however.

Figure 3:
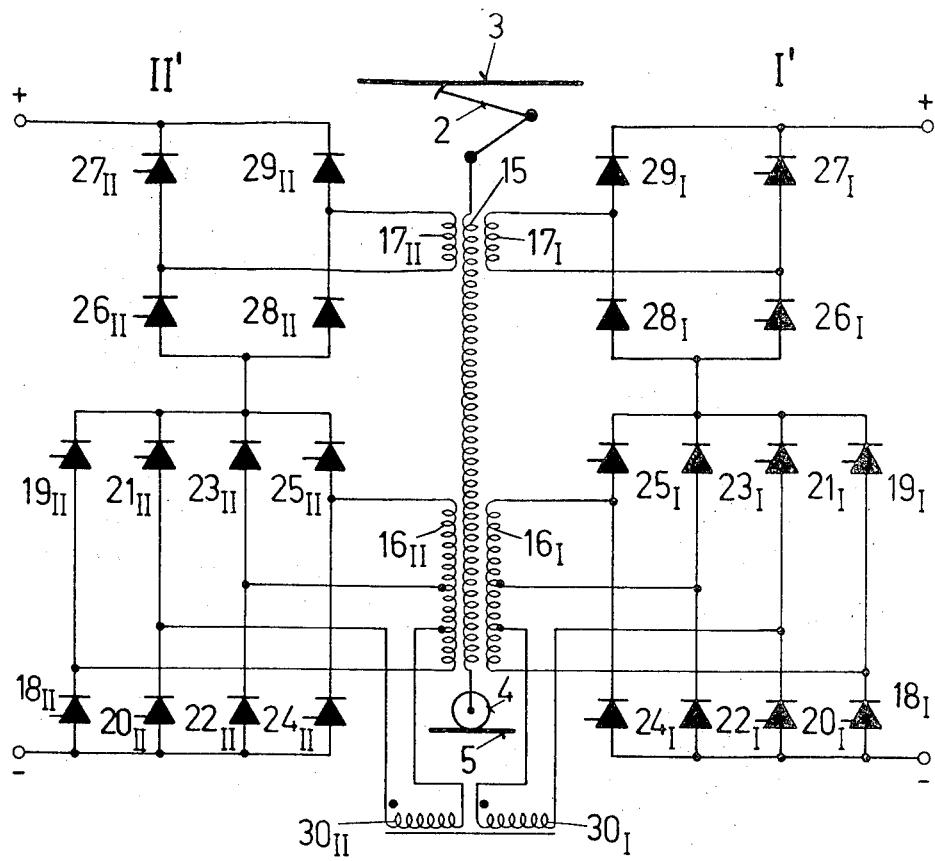
FIG. 3 shows an example of a further version of the invention.

In FIG. 3 a primary winding 15 of a transformer is shown connected to the single-phase a.c. network, on the one hand by way of a current collector 2 and a conductor wire 3, and on the other by (at least) one wheel 4 and a rail 5.

The motors supplied by the converter units I' and II' are not specifically shown.

Again converter unit I' is described as being representative of both units.

The secondary winding $16_I$ of the transformer is provided with tappings after one-fourth and one-half of its total number of turns. The central tapping is here connected to the link joining diodes $22_I$ and $23_I$, which represent the uncontrolled half of three semi-controlled converter bridge circiuts connected in series on the a.c. side. The controlled halves comprise thyristors $18_I/19_I$, $20_I/21_I$ and $24_I/25_I$.

In order to vary the d.c. output voltage continuously, only thyristors $18_I$, for example, (for one voltage half-wave) and $19_I$ (for the other) are always operated at part load, while coarse graduation if effected by means of the other bridge circuits.

Each of the lines leaving secondary windings $16_I$ and $16_{II}$ after one-fourth of the total turns contains a choke $30_I$ and $30_{II}$, respectively, and the two chokes are magnetically in reverse-series connection.

The operating principle of the reverse-series-connected chokes $30_I$ and $30_{II}$ is the same as that of chokes $14_I$ and $14_{II}$ described above (FIG. 1).

The semi-controlled bridge circuits supplied by secondary winding $16_I$ provide four coarse graduations (the same is also true, of course, of secondary winding $16_{II}$).

The number of steps is doubled by connecting a further semi-controlled converter bridge in series on the d.c. side to the three series-connected converter bridge circuits on the a.c. side.

This additional semi-controlled converter bridge consists of thyristors $26_I$ and $27_I$ and diodes $28_I$ and $29_I$, and is fed from another secondary winding $17_I$ of the transformer. Secondary windings $16_I$ and $17_I$ have the same total number of turns.

Here it is also important that with converter units of otherwise the same configuration the semi-controlled converter bridge circuits operated at part load must not be triggered simultaneously because then the chokes $30_I$ and $30_{II}$ would be ineffective, which would result in pronounced harmonics in the a.c. network.

The number of stages of the converter units I and II shown in FIG. 1 can also be doubled in the same manner as shown in FIG. 3.

The invention is not restricted to the diagrams shown in the drawing. Converter units in groups of four, six, etc. may also be employed, for example, in which case the chokes should be allocated in pairs, or all together on one core. The converter units can also be supplied by way of separate transformers.

What we claim is:

1. A static converter arrangement comprising at least two converter units having substantially the same configuration, each said converter unit comprising at least two semi-controlled converter bridge circuits feeding a common load, each said bridge circuit including a full wave controllable rectifier bridge portion and an uncontrollable rectifier bridge portion common to said two bridge circuits, a transformer for supplying alternating current to be rectified by said converter units, said transformer including a primary winding connectible to a source of alternating current and a secondary winding supplying each of said converter units, the opposite ends of said secondary windings being connected respectively to the controllable rectifier portions of said bridge circuits and a choke located in a circuit extending through a portion of said secondary winding and from a center tap thereon to the common uncontrollable rectifier portion of said bridge circuits, said controllable rectifier portions of said bridge circuits being operable separately from respective portions of said secondary winding established by said tap or in series across the ends of said secondary winding, and said chokes of said converter units being arranged magnetically in a reverse-series connection.

2. A static converter arrangement as defined in claim 1 wherein a single tap on said secondary winding for each converter unit is made to the center point thereof and said chokes of said converter units are connected respectively to lines leading from said taps.

3. A static converter arrangement as defined in claim 1 wherein each siad secondary winding includes a central tap connected to said common uncontrollable rectifier portion and a second tap midway between said central tap and the end of the winding, and said chokes of said converter units are connected respectively to lines leading from said second taps.

* * * * *